Patent 2,700,051

United States Patent Office 2,700,051
Patented Jan. 18, 1955

2,700,051

PRODUCTION OF POLYFUNCTIONAL COMPOUNDS

Edward L. Jenner, Wilmington, Del., assignor to E. I. du Pont de Nemours and Company, Wilmington, Del., a corporation of Delaware No Drawing. Application June 10, 1952, Serial No. 292,731

8 Claims. (Cl. 260—465.8)

This invention relates to a new process for the preparation of polyfunctional aliphatic organic compounds from the corresponding compounds which possess a lower number of functional groups.

This application is a continuation-in-part of my copending application Serial No. 189,690, filed October 11, 1950, now abandoned.

Polyfunctional, including difunctional, organic compounds have achieved considerable importance in recent years, particularly in the preparation of polymeric materials. Thus, in the manufacture of polyamides, dibasic acid such as adipic acid is condensed with a diamine such as hexamethylenediamine. In general, the difunctional compounds employed in the preparation of polymeric materials, such as polymeric amides and esters, have the functional groups connected by an intermediate chain of generally at least four carbons. The requisite difunctional monomeric compounds generally are obtained from available starting materials by reactions involving a plurality of steps. A simple technique whereby polyfunctional compounds such as diamines, dibasic acids or dihydric alcohols could be obtained from available monofunctional compounds should have potential technical importance.

It is an object of this invention to provide a new process for the production of polyfunctional aliphatic compounds.

It is another object of this invention to produce polyfunctional aliphatic compounds by the simple coupling of compounds containing a lesser number of functional groups.

It is still another object of this invention to produce difunctional compounds by the simple coupling of the corresponding monofunctional compounds.

Other objects of this invention will appear hereinafter.

It has now been discovered that polyfunctional aliphatic compounds can be obtained by a process involving oxidative coupling through hydroxyl radicals of saturated aliphatic organic compounds containing at least one functional grop. A preferred process involves treating an aliphatic compound containing at least one functional group, which compound is free from carbon-to-carbon unsaturation and contains at least two carbons, in a medium containing not more than 100 to 1 weight ratio of water to aliphatic organic compound with hydroxyl free-radicals and isolating the aliphatic dimeric polyfunctional compound.

The reaction involved in this process may be exemplified by the following equation showing the oxidative coupling of two molecules of propionic acid to produce one molecule of adipic acid:

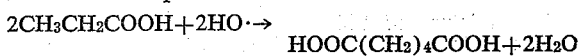

A test for the presence of hydroxyl radicals has been described by Stein and Weiss in "Nature" 166, 1104–5 (1950). The hydroxyl free-radicals are obtained conveniently by the action of a reducing agent on hydrogen peroxide or a suitable inorganic peroxide in substantially equivalent amounts such as shown in the equation

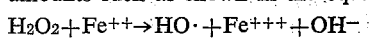

The oxidative coupling of this invention is suitably carried out by preparing an aqueous solution of the organic monofunctional compound and adding to this portionwise or continuously during the reaction the hydroxyl free-radical generating solution.

The following examples in which the parts are by weight further illustrate the practice of this invention.

*Example I*

To a solution of 495 parts of propionic acid in 100 parts of water, there was added simultaneously and proportionately over a period of 30 minutes a solution of 41 parts of hydrogen peroxide in 96 parts of water and a solution of 334 parts of ferrous sulfate heptahydrate with 118 parts of sulfuric acid in 1000 parts of water. During the reaction the ratio of water to organic acid was 2.72 to 1. The mixture was agitated during the addition of the solutions and held at the temperature of 25° C. during the time required for the addition. A solution of 48 parts of sodium hydroxide in 44 parts of water was added and the resulting solution was extracted five times with methyl ethyl ketone. The extracts were combind and the methyl ethyl ketone was distilled. The propionic acid was then distilled, a pressure of 10 mm. of mercury being employed in the last part of the distillation. The residue in the still pot comprised 40 parts and was a mixture of crystals and a viscous syrup. This mixture had a neutral equivalent of 72 (calculated for adipic acid, 73). The crystals were separated from the syrup, and when washed and dried were 6.5 parts. Recrystallization from water gave adipic acid, M. P. 144–145° C. Seven-tenths (.7) part of this acid was placed in a subliming tube and heated to 160° C. at a pressure of 17 mm. of mercury. Approximately .03 part sublimed and was identified as a mixture of the diastereomeric 2,3-dimethylsuccinic acids. The residue, 0.6 part, was adipic acid, M. P. 149–151° C. The identity of the adipic acid was confirmed by the preparation therefrom of the p-bromophenacyl ester of adipic acid.

*Example II*

A mixture of 285 parts of isobutyric acid and 200 parts of water was treated with solutions containing 41 parts of hydrogen peroxide in 96 parts of water and 334 parts of ferrous sulfate heptahydrate and 118 parts of sulfuric acid in 1000 parts of water as described in Example I. The ratio of water to organic acid was 5.08 to 1.0 When these solutions had been added, the mixture which consisted of two phases, was extracted three times with ether. The extracts were combined and the ether and isobutyric acid were distilled. Following the distillation of the isobutyric acid, a fraction (28 parts) was obtained boiling at 100–200° C./1 mm. which consisted of a mixture of white crystals and pale yellow liquid. A portion of the solid was removed, spread on a porous plate, and washed with ether. It then had a melting point of 94° C. This material possessed a neutral equivalent of 88 (calculated for dimethyladipic acid, 87). This material, which was a mixture of the diastereomeric 2,5-dimethyladipic acids, was recrystallized nine times from water, whereupon meso-2,5-dimethyladipic acid, M. P. 143–144° C., was obtained. The identity of this product was confirmed by a mixed melting point determination with an authentic sample.

*Example III*

To a mixture of 150 parts of pivalic acid and 4000 parts of water, there was added a solution of 17 parts of hydrogen peroxide in 40 parts of water, and a warm solution of 139 parts of ferrous sulfate heptahydrate and 49 parts of sulfuric acid in 155 parts of water. The addition was conducted as described in Example I. The reaction mixture had a ratio of water to organic acid of 28.4 to 1.0. At the end of the addition, the solid, which had crystallized from the reaction mixture, was separated by filtration, and after drying was found to comprise 25 parts. Upon recrystallization from a 1:1 mixture of xylene and acetic acid, ten parts of 2,2,5,5-tetramethyladipic acid, M. P. 190–191° C., was obtained. The neutral equivalent found was 101 (calculated for tetramethyladipic acid, 101). An additional 5.7 parts of tetramethyladipic acid was recovered from the aqueous phase of the reaction mixture.

Example IV

To a mixture of 780 parts of propionitrile in 500 parts of water, there were added solutions containing 41 parts of hydrogen peroxide in 96 parts of water and 334 parts of ferrous sulfate heptahydrate with 118 parts of sulfuric acid in 1000 parts of water in the manner described in Example I. The ratio of water to nitrile was 2.24 to 1.0. At the end of the addition period, the two layers present were separated and the aqueous layer was extracted four times with benzene. The organic fractions were combined and the benzene and propionitrile distilled. The distillation of the remainder gave the following fractions:

| Fraction | Parts | Boiling Point | $n_D^{25}$ |
| --- | --- | --- | --- |
| 1 | 10.5 | 112–133° C./10 mm | 1.4281 |
| 2 | 5.5 | 136–141° C./10 mm | 1.4321 |
| 3 | 5.5 | 142–151° C./7 mm | 1.4111 |

Fraction 1 was hydrolyzed by aqueous hydrochloric acid to yield 2,3-dimethylsuccinic acid, M. P. 192–194° C. Fraction 3 (adiponitrile) was similarly hydrolyzed to yield adipic acid, M. P. 151–153° C.

Example V

A solution was prepared by dissolving 198 parts of propylamine and 326 parts of sulfuric acid in 500 parts of water. To this there were added solutions containing 41 parts of hydrogen peroxide in 96 parts of water and 334 parts of ferrous sulfate heptahydrate with 118 parts of sulfuric acid in 1000 parts of water by the procedure described in Example I. The ratio of water to amine during this reaction was 8.82 to 1.0. An aqueous solution containing 180 parts of sodium hydroxide was added, bringing the pH of the mixture to 1.5. The iron was then precipitated by adding 108 parts of urea and refluxing the solution for 40 hours. Ferric oxide was removed by filtration, and a concentrated aqueous solution containing 280 parts of sodium hydroxide was added. The resulting solution was distilled, and during the distillation methanol was added to facilitate the removal of ammonia. A quantity of solid precipitated out during the distillation. A lighter-than-water organic phase (57 parts) formed and was separated. Upon distillation of the latter, 8.5 parts were obtained, B. P., 74–76° C./5 mm. When a portion of this fraction was treated with benzoyl chloride in aqueous alkali, the N,N'-dibenzoyl derivative of hexamethylenediamine was obtained. The melting point was 159–160° C., both alone and when mixed with an authentic specimen.

Example VI

A mixture of 348 parts of acetone and 300 parts of water was treated with solutions containing 41 parts of hydrogen peroxide in 96 parts of water and 334 parts of ferrous sulfate heptahydrate with 118 parts of sulfuric acid in 1000 parts of water as described in Example I. At the end of the addition period, the mixture was extracted repeatedly with ether, the extract was dried, and the ether was distilled. The fractional distillation of the residue gave a fraction (2.6 parts), B. P., 62° C./7 mm. This material was identified as acetonylacetone by the preparation of the bis-phenylhydrazone and the conversion of this derivative to 2,5-dimethyl-1-anilinopyrrole. Both derivatives were compared by mixed melting point determinations with known specimens.

Example VII

To a mixture of 83 parts of pivalonitrile and 1300 parts of water, there was added a solution of 34 parts of hydrogen peroxide in 130 parts of water and a solution of 278 parts of ferrous sulfate heptahydrate with 98 parts of sulfuric acid in 580 parts of water. The addition was conducted as described in Example I. The reaction mixture had a ratio of water to organic reactant of 25.7 to 1.0. At the end of the addition, the solid which had precipitated from the reaction mixture was isolated by filtration, washed with water, and dried. The 2,2,5,5-tetramethyladiponitrile thus obtained comprised 42.5 parts (a 52% yield). It was recrystallized from 140 parts of ethanol to give a first crop of 34.5 parts; M. P., 137° C.

Example VIII

To a mixture of 500 parts of propionamide and 150 parts of water, there was added a solution of 68 parts of hydrogen peroxide in 200 parts of water and a solution of 556 parts of ferrous sulfate heptahydrate with 196 parts of sulfuric acid in 620 parts of water. The two solutions were added simultaneously and proportionately over a period of 20 minutes, during which time the reaction mixture was maintained at a temperature of 75° C. The reaction mixture was extracted seven times each with 160 parts of methyl ethyl ketone. The solvent and propionamide were distilled, and the residue was treated with water, whereupon 7 parts of a light-colored solid was obtained. A portion of this was crystallized from acetone to yield crude adipamide as a white powder; M. P. 220°–225° C. (not depressed by admixture with adipamide). Another portion of the product was hydrolyzed with aqueous hydrochloric acid to yield crystalline adipic acid; M. P. 133°–138° C. A single recrystallization from water raised the melting point to 143°–145° C. The melting point of this latter product was not depressed when mixed with the recrystallized adipic acid (M. P. 144°–145° C.) obtained in Example I.

Example IX

To a mixture of 192 parts of tert.-butyl alcohol, 41 parts of sulfuric acid, and 800 parts of water, there was added a solution of 36 parts of hydrogen peroxide in 130 parts of water and a solution of 278 parts of ferrous sulfate heptahydrate with 98 parts of sulfuric acid in 570 parts of water. The addition was conducted as described in Example I. The reaction mixture was extracted four times with methyl ethyl ketone. The methyl ethyl ketone and tert.-butyl alcohol were distilled to a pot temperature of 90° C. at 7 mm. pressure. The residue, which consisted of 26.5 parts, was crude 2,5-dimethyl-2,5-hexanediol. After recrystallization from ethyl acetate, the pure glycol, melting point 85°–87° C., was obtained.

*Anal.*—Calc'd for $C_8H_{18}O_2$: C, 65.71; H, 12.41; Mol. Wt. 146. Found: C, 65.65; H, 12.34; Mol Wt. 153.

Example X

To a mixture of 443 parts of adiponitrile, 98 parts of sulfuric acid, and 2000 parts of water, there was added a solution containing 34 parts of hydrogen peroxide in 130 parts of water and a solution of 278 parts of ferrous sulfate heptahydrate with 98 parts of sulfuric acid in 575 parts of water. The addition was conducted as described in Example I. The reaction mixture comprised two layers which were separated. The aqueous layer was then extracted three times with methyl ethyl ketone, and the combined organic fractions were washed with aqueous sodium carbonate. The methyl ethyl ketone and adiponitrile were then distilled to a pot temperature of 130° C. at 0.2 mm. pressure. The 12-carbon tetranitrile, obtained as a still residue, comprised 56.3 parts (a 53% yield). The tetranitrile was then distilled in a molecular still at approximately 170° C. and 0.005 mm. pressure. The distillate crystallized in large part. The crystalline material, after digestion with hot ethanol, formed white crystals; M. P., 128°–132° C.

*Anal.*—Calc'd. for $C_{12}H_{14}N_4$: C, 67.26; H, 6.59; N, 26.15; Mol. Wt., 214. Found: C, 67.63; H, 6.75; N, 25.84; Mol. Wt., 218.

Example XI

To a mixture of 146 parts of tert.-butylamine, 196 parts of sulfuric acid, and 1000 parts of water, there was added a solution of 34 parts of hydrogen peroxide in 130 parts of water and a solution of 278 parts of ferrous sulfate heptahydrate with 98 parts of sulfuric acid in 580 parts of water. The addition was conducted as described in Example I. The entire reaction mixture was poured through a column of a cation exchange resin (Nalcite HCR), a commercial sulfonic acid type cation exchange resin similar to that described in J. A. C. S. 69, 2830 (1947). The product was eluted with aqueous sulfuric acid. The first fractions of eluate contained the iron salts—the later fractions, the amines. The amines were liberated with aqueous sodium hydroxide and extracted from the aqueous solution with chloroform. After distillation of the chloroform and tert.-butylamine, a fraction, 6.6 parts, B. P., 78°–79° C./13 mm. was obtained. This material is 2,5-dimethyl-2,5-diaminohexane.

*Anal.*—Calc'd. for $C_8H_{20}N_2$: C, 66.60; H, 13.97; N, 19.42; N. E. 72.1. Found: C, 67.18; H, 13.86; N, 17.22; N. E., 74.4.

Example XII

To 2 parts of vanadyl sulfate dihydrate dissolved in 100 parts of water was added one part of sulfuric acid and 2 parts of pivalic acid. The ratio of water to pivalic acid was 50 to 1. The resulting solution was passed through a column of amalgamated zinc (Jones reductor) to reduce the vanadyl ion to the vanadium II state. Oxygen was then passed through the solution until the color changed from the characteristic violet of vanadium II to the deep blue of the vanadyl ion. The blue solution thus obtained was extracted with ether in a continuous extractor. The extract was dried and the ether was distilled. The residue, approximately 2 parts of nearly colorless viscous liquid, consisted principally of pivalic acid and tetramethyladipic acid. A sample of this material was placed on a silicic acid column containing adsorbed water as the immobilized phase and developed with chloroform-butanol mixtures. Comparison of the chromatogram thus obtained with control chromatograms on known mixtures indicated that approximately 6% of the pivalic acid had been converted to tetramethyladipic acid.

Example XIII

A solution was prepared from 27.8 parts of ferrous sulfate, 100 parts of propionic acid, 4.9 parts of sulfuric acid, and approximately 300 parts of water. Air was passed through this solution at room temperature for a period of five days. At the end of this time, the reaction mixture was extracted continuously with benzene. The benzene was distilled and the residue was examined by partition chromatography using the technique described in Example XII. The quantity of adipic acid (contaminated with isomeric 6-carbon dibasic acids) was 0.008 part. That this product was principally adipic acid was confirmed by melting point and mixed melting point determinations.

Example XIV

An oxidation catalyst was prepared by wrapping platinum and palladium strips in alternate spirals around a glass tube (completed catalyst resembled a barber pole). The catalyst was cleaned first with nitric acid and then with aqueous sodium hydroxide. It was then placed in a flask which was charged with 100 parts of propionic acid and 300 parts of water. The free volume in the reaction vessel was filled with a mixture containing equal parts by volume of hydrogen and oxygen. The flask was then shaken for sixty hours at room temperature. The mixture was extracted with benzene and product characterized as in Example XII. A total of 0.0181 part of 6-carbon dicarboxylic acids was found.

Example XV

The reaction vessel was charged with 100 parts of propionic acid and 100 parts of water. A cylinder prepared from heavy gauge silver gauze was placed in the solution. For five days, air was introduced underneath the surface of the liquid so that it came into contact with the silver gauze. During this time the mixture was held at reflux temperature. The solution was extracted with benzene, and adipic acid was isolated and characterized as described in Example XII.

Example XVI

In a solution of 100 parts of propionic acid in 100 parts of water, there was suspended two parts of a catalyst which comprised 0.64% palladium on 80–120 mesh alumina. The mixture was vigorously agitated while an aqueous solution containing 14 parts of hydrogen peroxide was added. The addition required eight hours, after which the mixture was stirred an additional sixteen hours. The catalyst was removed by filtration and the filtrate was extracted with benzene. Adipic acid was characterized as described in Example XII.

Example XVII

A mixture was prepared from 100 parts of propionic acid, 400 parts of water, 10 parts of sulfuric acid, and 55 parts of cerous carbonate. This mixture was maintained at 25° C. while 700 parts of oxygen was passed through it. The solution was then extracted with benzene and the product isolated as described in Example XII. A total of 0.04 part of 6-carbon dicarboxylic acids was found.

A requirement for this reaction is the presence of hydroxyl free-radicals. The examples illustrate some of the methods that may be employed. These methods include aqueous systems.

The hydroxyl radical employed in this reaction is suitably provided by generating it from an inorganic peroxide that will yield hydrogen peroxide under acidic conditions or from hydrogen peroxide itself and a reducing agent such as an inorganic salt having the metal in the form of an oxidizable ion as, for example, a lower valence state of a metal of series 4 of the periodic table and of atomic number 22 to 26, e. g., a substance yielding ferrous, titanous, or vanadous ions. An alternative method for furnishing hydroxyl radicals is by employing radiant energy or nuclear radiation on hydrogen peroxide or water. A further method is by the use of oxygen with ferrous (+2) or cerous (+3) ions in an aqueous system. To obtain efficient use of the hydroxyl free-radicals, it is desirable that their relative concentration in the reaction mixture be low at any time in view of their high activity and short life. Accordingly, aqueous solutions containing the peroxide and the reducing agent, that is, oxidizable ions, are preferably added gradually and mixed in the reaction mixture in the presence of the functional organic compound employed. The total amount of hydroxyl free-radical supplied to the reaction mixture may vary between wide limits, preferably, however, they should be supplied in molar ratios of the functional organic starting material to hydroxyl radical of between 1:1.5 and 5:1.

In the process of this invention the functionality of the organic compound containing at least one functional group is increased by a dimerization or coupling process. Any organic functional compound which is stable (not oxidized) in the presence of a cold, dilute, acidic, aqueous hydrogen peroxide solution, i. e., an aqueous hydrogen peroxide solution having a pH of 2.0 to 6.0 and a temperature of about 0–30° C. and a concentration of about 1–3%, and having the following characteristics, may be so coupled by the process of this invention. The organic compound employed should have at least two carbon atoms, at least two hydrogen atoms on one of said carbon atoms, and it should have a group consisting of carbon and hydrogen which is directly attached to only one functional group. The compound should be saturated, i. e., free from carbon-to-carbon unsaturation and be non-aromatic. The functional group present should be a negative group containing a polyvalent element. Compounds containing the following functional groups are included and will be stable in the presence of a cold, dilute, acidic, aqueous hydrogen peroxide solution; carbonyl (including aldehyde and ketone), carboxyl (including acids and esters), carbonamide, cyano, amine, and alcohol groups.

The compounds useful for the purpose of this invention include those which are saturated, have at least two carbons and can be represented by the formula Y—$CH_2$—Z wherein Y is hydrogen or an aliphatic group and Z is an aliphatic group containing a functional (or negative) group which contains a polyvalent element. In the above formula, Y may be the same as Z, if at least one more carbon-hydrogen group is contained therein, in which case a difunctional compound can be used as illustrated in Example X.

The organic functional materials that are converted into a coupled or dimeric functional compound by the process of this invention are those aliphatic compounds which have at least two carbons, preferably contain a $CH_3CH_2$- group, usually not more than 12 carbons and generally contain up to six carbons and are free from carbon-to-carbon unsaturation. Representative examples of such compounds are butylamine, amylamine, laurylamine, butyronitrile, and butyric acid. The compounds employed are soluble in water to an amount of at least 0.1%. The solubility is generally at least 0.5% and preferably 3% or more.

The amount of water present in the reaction mixture should not exceed 100 and generally is less than 30 times the weight of aliphatic compound. When larger amounts of water are present, the concentration of organic compound is low and the yield of polyfunctional compound is decreased. Preferable ratios of water to organic compound are less than 9 to 1 and generally between 1 to 1 and 5 to 1.

The aqueous reaction mixture, when such is employed, is usually acidic to maintain homogeneity. When ferrous sulfate is employed as the reducing agent, sulfuric acid is suitably employed as the mineral acid. The pH of the reaction media accordingly should not exceed 7 and preferably should be less than 2.

The reaction time is not critical but generally requires at least 15 minutes for the addition of the hydroxyl-free radical source, for example, the generating solutions, to the organic compound. Temperatures are dependent upon the particular system used and generally vary from, e. g., −30° C. to 500° C. However, the preferred temperature is of the order of −10° C. to 25° C. when aqueous systems are employed.

The polyfunctional product is isolated by any suitable technique, depending on the properties of the organic materials obtained. In general, the isolation involves separation of the product, which contains a plurality of functional groups, from the water and inorganic materials. Distillation, crystallization or precipitation may be employed in the isolation and purification of the polyfunctional organic compound. The method chosen generally is dependent upon the functional groups present in the coupled product.

The products obtained by the process of this invention are useful in the preparation of polymers, for example, the polyamines can be reacted with dibasic acids to give polymeric amides useful as fibers, films, and coating compositions. The polynitriles and polycarbonyls can be readily converted to the polyamines. The polybasic acids obtained by the process of this invention are useful in the preparation of plasticizers for polymers, for example, upon esterification with alcohols containing one hydroxy group. The polyhydroxyl compounds are useful in the preparation of condensation polymers having utility as films and coatings for fabrics. All of the polyfunctional compounds of this invention are also useful as intermediates for the preparation of other organic compounds.

Throughout the specification and claims, any reference to parts, proportions and percentages refers to parts, proportions, and percentages by weight unless otherwise specified.

Since it is obvious that many changes and modifications can be made in the above-described details without departing from the nature and spirit of the invention, it is to be understood that the invention is not to be limited to said details except as set forth in the appended claims.

I claim:

1. The process for the production of polyfunctional compounds which comprises reacting hydroxyl free-radicals in an aqueous solution with an aliphatic compound containing 2 to 12 carbon atoms, being free from carbon-to-carbon unsaturation, and containing at least one functional group selected from the class consisting of cyano, carboxyl, carbonamide, carbonyl, amino, and alcohol groups, said solution having a pH less than 7.0 and containing not to exceed one hundred times as much water by weight as aliphatic compound, and isolating the polyfunctional compound so produced.

2. The process for the production of polyfunctional compounds which comprises reacting hydroxyl free-radicals in an aqueous solution with an aliphatic compound containing 2 to 6 carbon atoms, being free from carbon-to-carbon unsaturation, and containing at least one functional group selected from the class consisting of cyano, carboxyl, carbonamide, carbonyl, amino, and alcohol groups, said solution having a pH less than 7.0 and containing not to exceed one hundred times as much water by weight as aliphatic compound, and isolating the polyfunctional compound so produced.

3. The process for the production of polyfunctional compounds which comprises reacting hydroxyl free-radicals in an aqueous solution with an aliphatic compound containing 2 to 6 carbon atoms, being free from carbon-to-carbon unsaturation, and containing at least one functional group selected from the class consisting of cyano, carboxyl, carbonamide, carbonyl, amino, and alcohol groups, said solution having a pH less than 7.0 and containing not to exceed nine times as much water by weight as aliphatic compound, and isolating the polyfunctional compound so produced.

4. The process for the production of difunctional compounds which comprises reacting hydroxyl free-radicals in an aqueous solution with an aliphatic compound containing 2 to 5 carbon atoms, being free from carbon-to-carbon unsaturation, and containing one functional group selected from the class consisting of cyano, carboxyl, carbonamide, carbonyl, amino, and alcohol groups, said solution having a pH less than 7.0 and containing not to exceed thirty times as much water by weight as aliphatic compound, and isolating the difunctional compound so produced.

5. The process for the production of difunctional compounds which comprises reacting hydroxyl free-radicals in an aqueous solution with an aliphatic compound containing 2 to 5 carbon atoms, being free from carbon-to-carbon unsaturation, and containing one functional group selected from the class consisting of cyano, carboxyl, carbonamide, carbonyl, amino, and alcohol groups, said solution having a pH less than 2.0 and containing not to exceed thirty times as much water by weight as aliphatic compound, and isolating the difunctional compound so produced.

6. The process for the production of difunctional compounds which comprises reacting hydroxyl free-radicals in an aqueous solution with an aliphatic compound containing 2 to 5 carbon atoms, being free from carbon-to-carbon unsaturation, and containing one functional group selected from the class consisting of cyano, carboxyl, carbonamide, carbonyl, amino and alcohol groups, said solution having a pH less than 2.0 and containing not to exceed nine times as much water by weight as aliphatic compound, and isolating the difunctional compound so produced.

7. The process for the production of adipic acid which comprises reacting hydroxyl free-radicals in an aqueous solution with propionic acid having a pH less than 2.0 and containing not to exceed thirty times as much water by weight as propionic acid, and isolating the adipic acid so produced.

8. The process for the production of tetramethyladiponitrile which comprises reacting hydroxyl free-radicals in an aqueous solution with pivalonitrile having a pH less than 2.0 and containing not to exceed thirty times as much water by weight as pivalonitrile, and isolating the tetramethyladiponitrile so produced.

References Cited in the file of this patent

UNITED STATES PATENTS 2,426,224    Kharasch _____ Aug. 26, 1947

OTHER REFERENCES

Alaszewska et al., Ber. Deut. Chem., vol. 71B, pages 1033–40 (1938).
Evans et al., Chem. Abst., vol. 41, page 7158 (1947).
Bray et al., J. Am. Chem. Soc., vol. 72, pages 1401–2 (1950).